Figures 1, 2:
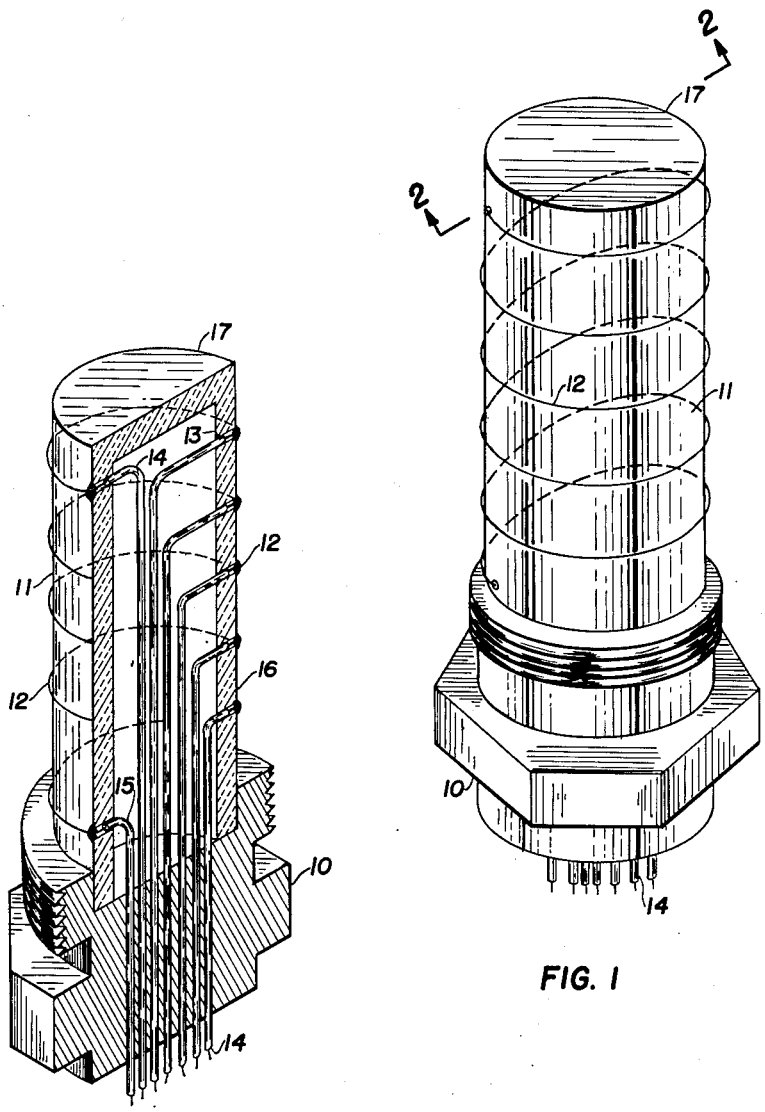

June 6, 1961 G. A. MARSH ET AL 2,987,672
IMPEDANCE TEST APPARATUS
Filed Nov. 21, 1957 3 Sheets-Sheet 1

INVENTORS
GLENN A. MARSH
BY EDWARD SCHASCHL
ATTORNEY

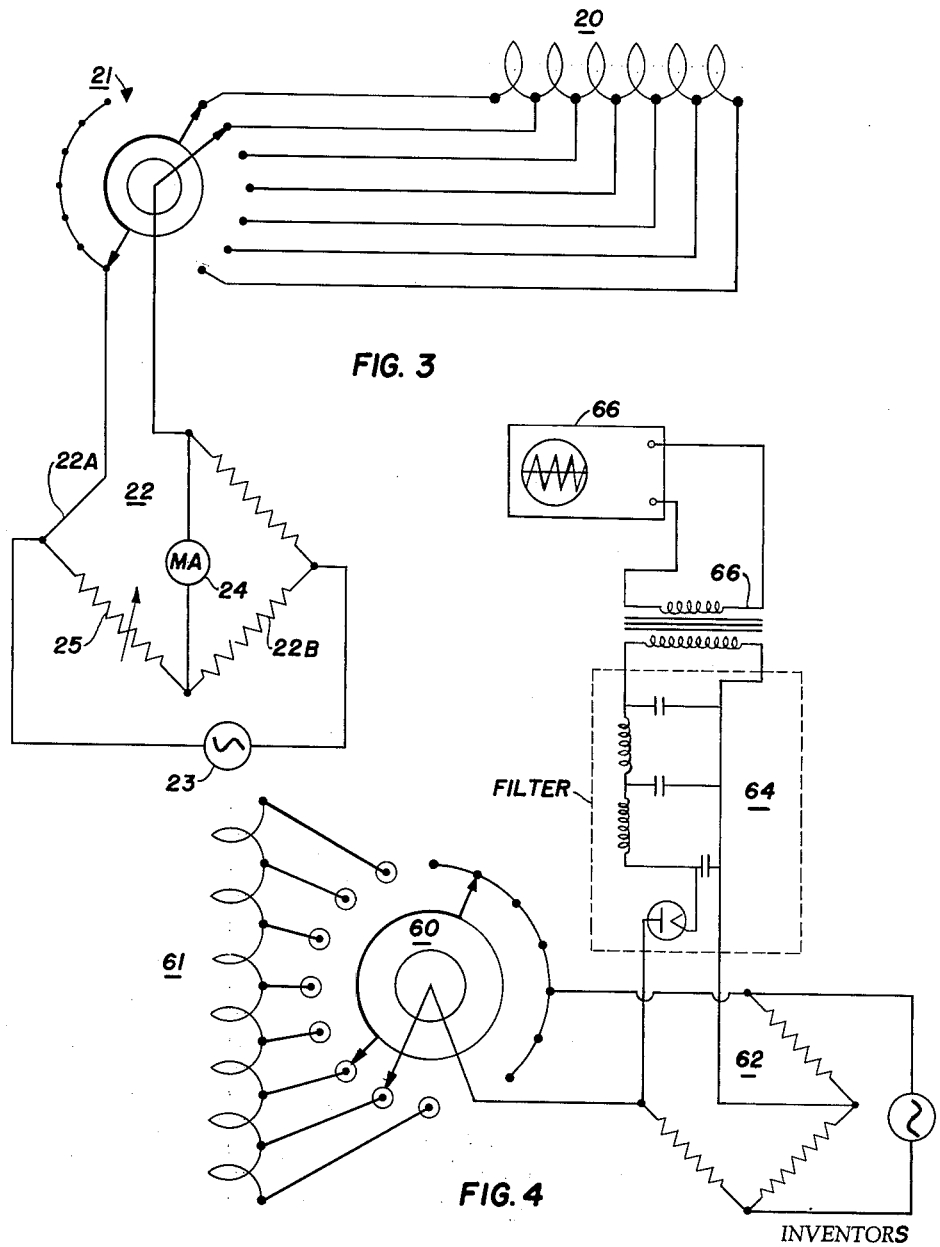

June 6, 1961  G. A. MARSH ET AL  2,987,672
IMPEDANCE TEST APPARATUS

Filed Nov. 21, 1957  3 Sheets-Sheet 3

INVENTORS
BY GLENN A. MARSH
EDWARD SCHASCHL
ATTORNEY

United States Patent Office 2,987,672
Patented June 6, 1961

2,987,672
IMPEDANCE TEST APPARATUS
Glenn A. Marsh and Edward Schaschl, Crystal Lake, Ill., assignors to The Pure Oil Company, Chicago, Ill., a corporation of Ohio
Filed Nov. 21, 1957, Ser. No. 697,870
4 Claims. (Cl. 324—71)

This invention relates to the electrical measurement of corrosion. It is more specifically concerned with an electrical method for qualitatively evaluating pitting corrosion.

According to this invention, pitting or localized corrosion is detected and distinguished from a general corrosion situation, where large sections or all of a metal surface corrodes at a relatively uniform rate, by employing as a sensing element a test assembly comprising a plurality of serially connected sections of a small diameter wire. Electrical conducting leads are connected to the terminal ends of the wire element and to the several junctions between each of the sections. Each of the sections is separately connected by means of these conductors to an electrical bridge circuit through a multiple switching means which permits the respective determination of the resistance of each section. When pitting or localized corrosion occurs, the resistance of the section changes. By comparing the resistances of the various sections, any deviation from the average or normal increase in resistance which is indicative of localized or pitting corrosion can be ascertained.

When a corrodible metal is exposed to a corrosive environment, generally the attack occurs at a relatively uniform rate over the entire, or a large percentage of, the exposed metal surfaces. Under certain conditions, however, a more dangerous type of corrosion occurs at anodes of limited area and results in the formation of deep pits within the metal and even complete perforations. Pitting, which is a highly localized form of corrosion, leads to perforations with attendant costly consequences despite the fact that an almost negligibly small percentage of the area of metal exposed to attack has been affected. Aluminum, stainless steel, zinc, copper and other film-protected metals are susceptible to pitting. When exposed to a corrosive environment, where the surface film is almost but not quite entirely protective. Although the overall corrosion rate is practically zero, the penetration rate of a pit can be as high as 5000 mpy. In general, pitting results from local differences in the environment such as differential velocity, temperature, concentration, aeration or the like, or can be the result of a local difference due to the heterogeneity of a metal surface.

Detection of this localized form of corrosion is difficult because of the relatively small amount of metal which is lost from the metal surface due to the formation of pits within the metal. It is known in the art that the corrosion of a metallic material of construction produces a large increase in the electrical resistance of the corroded specimen. Various electrical tests for estimating the corrosion rate of metallic materials of construction have been devised employing electrical resistance methods which directly measure the loss of metal based on the change in resistance of a corroding specimen. The apparatus and techniques employed in these methods, however, do not satisfactorily determine or detect corrosion pitting. It is, therefore, the primary object of this invention to provide an apparatus for determining localized corrosion and pitting. It is another object of this invention to employ an electrical apparatus for correlating change in electrical resistance with the presence of pitting or localized corrosion of a metallic material of construction exposed to a corrosive environment. These and other objects will become more apparent from the following detailed description of this invention.

Figures 5, 6:
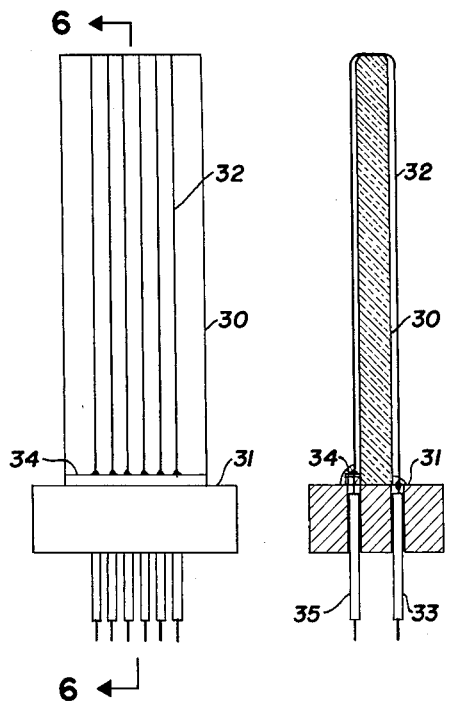
Figure 8:
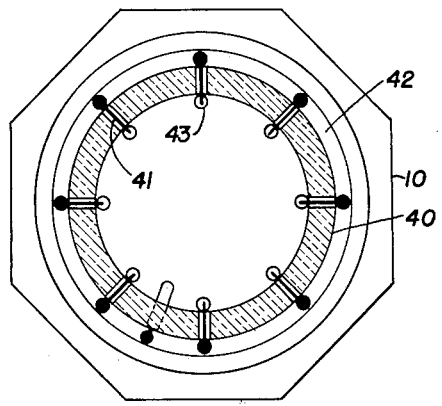
Figure 7:
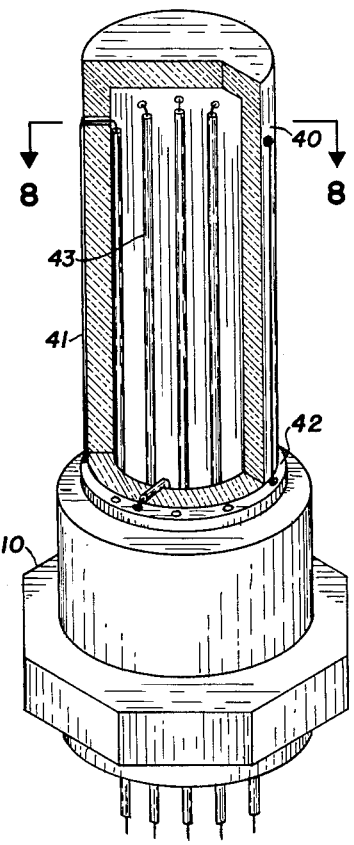

FIGURE 1 illustrates one embodiment of the corrosion test-assembly of this invention.
FIGURE 2 is a cross-sectional elevation view through 2—2 of the embodiment shown in FIGURE 1.
FIGURE 3 presents schematically a basic circuit diagram whereby the change in electrical resistance of the corroding specimens can be detected.
FIGURE 4 illustrates an electrical network for continuously monitoring the exposed system in order to rapidly detect the presence of pitting.
FIGURE 5 shows an alternative embodiment of the instant invention.
FIGURE 6 shows a cross-sectional view of FIGURE 5 through line 6—6.
FIGURE 7 illustrates still another embodiment of the instant invention.
FIGURE 8 is a cross-sectioned view through line 8—8 of the embodiment presented in FIGURE 7.

The rapid detection of pitting corrosion is desirable not only in making corrosion investigations, but also as an aid in inspection work in order to forestall the untimely failure of process vessels which are not corroding uniformly but only in a localized manner.

Because of the nature of pitting corrosion, uniform loss of metal is not produced. Therefore, adjacent sections of a test specimen exposed to a corrosive environment will be affected by differing degrees of corrosion. This will result in a difference in the electrical resistance of selected sections of an exposed test specimen which is substantially identical in composition and form. According to this invention, a sensing element is provided which will permit a comparison to be made of adjacent sections of a metallic material of construction exposed to a corrosive environment in order to detect a deviation from the normal increase in resistance due to the uniform loss of metal resulting from the general type of corrosion. By comparing the resistances obtained for each section, it can be ascertained whether or not pitting corrosion is occurring in the test specimen.

One embodiment of the corrosion test-element employed in this invention is shown in FIGURE 1. A suitable support or base element, such as a pipe plug 10, contains a tubular core 11 of an electrical insulating material which is not susceptible to corrosion by the environment to be investigated, for example, ceramic or glass. A test strip, 12, prepared from a suitable length of a fine wire is helically wound on the central core 11 with each loop being electrically insulated from the others. Openings 13 in the core are provided adjacent to the bight section of each loop in order to provide a plurality of spaced wire sections of substantially the same length. Low-resistance, electrical conductors 14 are positioned within the tubular core 11 and electrically connected to the fine-wire test-element by soldering or other suitable electrical connection means to the bight section of each loop through access openings 13. The joints are protected against corrosion by coating them with a non-corrodible cement or plastic or other suitable protective coating. The terminal ends of the test section are electrically connected to low-resistance leads 14 and 15. The end of the tubing is preferably enclosed by a suitable cap 17 in order to exclude the corroding medium from within the inner volume of the core.

The separate sections are connected to a suitable bridge circuit through a multiple switching means which permits each test section to be separately connected in one of the parallel resistance branches of a conventional electrical bridge. Connected across the resistance branches of the bridge is a sensitive metering device, such as a milliammeter, which permits the change in resistance of each section to be separately determined and compared with the resistance of the other sections of the test element.

In employing the corrosion test-assembly of this invention as a sensing element for detecting pitting corrosion, the assembly is installed in the corrosive environment to be investigated and electrically connected to the detecting network. Periodically, the resistance of each test section is determined. If the corrosion is uniform or general, the resistances of all of the segments remain substantially equal. If, however, there is localized corrosion or pitting, the resistance of one or more segments increases faster than those of the others. Accordingly, pitting or localized corrosion can readily be distinguished from general or uniform corrosion by means of the apparatus of this invention.

In a specific embodiment of the sensing element of this invention, a porcelain tubing 2 inches long, having an outside diameter of 1 inch and an inside diameter of ¾ inch, is mounted in a 1-inch pipe-plug or bushing by recessing the face of the bushing and cementing the porcelain tube in place. At ⅛″-spaced intervals along the side of the porcelain tube, ⅛-inch diameter holes are provided. A 30-inch length of steel wire having a diameter of 0.005 inch is helically wound on the central core in spaced loops ⅛ inch apart. An insulated, #14 copper wire is disposed within each hole and soldered to the adjacent bight portion of the test-section loop. In order to avoid extraneous effects, the soldered joints are coated with Armstrong A–2 adhesive. This adhesive also serves to plug the plurality of openings through which these wires pass. The remainder of the low-resistance electrical conductors is insulated. The terminal end of the tubing is capped with a plastic cap which is cemented in place to provide a fluid-tight interior chamber in the porcelain tube. The low-resistance leads are passed through the pipe-plug base element and are connected to a multiple-point switch which permits each of the resistance sections to be sequentially connected to a suitable ammeter in order to permit the determination of the change in resistance of each section during the test period.

The test sections preferably are fabricated from small-diameter electrical wire, having a diameter of not more than about 10 mils, when test assemblies are prepared for short-term, rapid corrosion investigations. In the event, however, that it is desired to investigate the effect of pitting corrosion for extended periods, wire diameters up to about 50 mils can be used. Although wires having a circular cross-section are preferred because of the ready availability of these wires, other cross-sectional configurations can also be employed. In general, the selection of the material of construction employed in the fabrication of the test element will depend upon the facility with which the pitting corrosion is to be determined. Generally, a rapid determination of pitting corrosion or rapid corrosion studies are preferred. Accordingly, the element selected must be such that any manifestations of pitting must deleteriously affect the resistance of the test section sufficiently so as to permit an accurate determination of the change in resistance of the test section due to either pitting or localized corrosion, or general or uniform corrosion. Accordingly, test specimens or test sections having a diameter of not more than 5 mils are preferred. Wires of this nature are employed in sections 3 to 10 inches long. As pointed out above, however, other test-section configurations will suitably function in this service and can also be used so long as the selected wire provides sufficient sensitivity.

It is evident from the above-described embodiment that a variety of designs can be employed for use in carrying out the instant invention. One such embodiment is shown in FIGURE 5 in which the central core or insulator comprises a strip of insulating material 30 mounted on a suitable base element 31. In this instance, the lengths of test section are laid over the terminal end of the insulator core to provide sections of suitable length. One end of each test section 32 is connected to a low-resistance, electrical connector 33. The other end of each of the test sections is connected to a low-resistance, bus-bar 34 which permits the use of a single conductor 35. It is preferred that the soldered joints and bus-bar be covered with a protective coating, as hereinbefore discussed. Conductors 34 and 35 are employed to interconnect the corrosion test-assembly to the multiple-pole switching means whereby the resistances of the several test sections can be determined and compared. In this design the insulator element can either be plane-shaped or tubular-shaped.

In another design, employing a tubular-shaped core section 40, the test elements 41, as shown in FIGURE 7, instead of being wrapped around the outer surface of the insulated core in a helical coil, are laid along the outside surfaces as longitudinal strips. As in the embodiment shown in FIGURE 5, the number of electrical conductors that are employed for connecting the several test specimens to the detecting and measuring network is minimized by providing a common bus-bar conductor 42, which is mounted on the central core at the base of the insulator. The common conductor is prepared from a low-resistance, electrical conductor in order that the effect of the resistance of this element will be negligible. The several test sections 41 are laid along the outer wall of the central insulator core 40, one end being connected to bus-bar 42 and each of the other ends connected respectively to a plurality of low-resistance leads 43 disposed in the inside of the tubular core. The end of the tubular core is then capped with a suitable closure in order to provide a fluid-tight seal at this point. The foregoing alternative embodiments, however, are only illustrative of a number of different designs which can be utilized in carrying out the instant invention. It is apparent from these designs that a number of alternative equivalents will be suggested to those workers skilled in this art.

FIGURE 3 shows the test element of this invention interconnected in a simple, Wheatstone-bridge circuit employed as a metering network in making the comparative change-in-resistance investigation for determining pitting corrosion. In this network, test element 20 (shown schematically) is connected by means of a multiple-contact switch 21 to Wheatstone-bridge circuit 22. A suitable source of low-voltage, alternating current 23 is connected to the bridge circuit. A sensitive, current-metering device 24, such as a milliammeter, is connected across the resistance branches 22–A and 22–B of the bridge circuit. In use, the variable resistance 25 in resistance branch 22–B is employed to balance the bridge and permit the calculation, in a conventional manner, of any unequal resistance change in each of the test sections of test element 20 produced by pitting corrosion.

In another embodiment of this invention, shown in FIGURE 4, a mechanical or electronic automatic switching means and devices for amplifying the differences in resistances of the test sections are used. In this embodiment, motor-driven switch 60 consecutively connects one segment after another of test element 61 (shown schematically) to Wheatstone bridge 62. The variation in amplitude caused by switching is filtered out by electronic means 64, and the resultant signal is essentially direct current if all of the segments are corroding uniformly. When pitting occurs, the resistances of the segments become unequal and the resulting signal has a step-shaped wave. This signal is filtered lightly, employing a conventional filter 64 (shown schematically) to make a rounded A.C. wave, and the modified signal is passed through transformer 65. The secondary of the transformer passes only the A.C. wave component, and the signal is amplified and fed to oscilloscope 66. The amplified A.C. wave is displayed on oscilloscope 66 and is an indication of the pitting of the test section specimens.

Conventional materials of construction generally used in parts of the nature shown are employed in fabricating the test element of this invention. The base element can be in any suitable form for installing the test assembly in a corrosive environment. Pipe fittings fabricated from stainless steel in the form of plugs or brushings are especially adaptable because of the facility with which corrosion probes or test assemblies using these elements as a base can be installed in flow systems carrying a corrosive environment. More simple installations, however, can utilize rubber stoppers or other such means. The insulator core depending from the base element can be either in a plane or tubular form in order to appropriately support the test elements. This support means is prepared from an insulating material which is not susceptible to attack by the corrosive environment. Glass, ceramics or corrosion-resistant plastics, such as the chlorotrifluoroethylene polymer compounds, nylon, or other types of corrosion-resistant materials, as well as the polyvinyl chloride plastics are suitable. The test sections in wire form are prepared from any selected material of construction which is to be investigated for susceptibility to pitting corrosion. The material can either be prepared from the same material which is used in the fabrication of the system exposed to the corrosive environment, or can be of a different material.

The working current which is employed to energize the corrosion test-assembly can either be alternating current or direct current. Because of the number of disadvantages in employing a direct working current, it is preferred that alternating current be used for measuring or determining the pitting corrosion detected by the corrosion test-assembly of this invention. In general, a low-voltage alternating current is employed by means of which a voltage within the range of about 10–100 millivolts, and an alternating current having a frequency of 50–1000 cycles per second, can be used. Although these values are preferred, values outside of these ranges may be necessary in special situations.

What is claimed as our invention is:

1. An apparatus for determining non-uniformity of corrosion comprising, a sensing element including a plurality of small-diameter, corrodible, electrical wire sections, and low-resistance electrical conductors connected adjacent to the terminal ends of each of said sections for electrically connecting said sections to switch means; a resistance-measuring electrical bridge circuit, comprising four resistance-branches serially connected in closed circuit to form four junctures, switch means adapted to consecutively and separately electrically connect each of said wire sections as one resistance branch of said bridge circuit means for rapidly driving said switch, an alternating current source connected across two opposite junctures of said bridge circuit, rectifier-filter means electrically connected across the two remaining junctures of said bridge circuit to rectify the alternating voltage output thereof and lightly filter the resulting direct current, and meter means transformer-coupled to the output of said rectifier-filter for producing visible manifestations of the alternating voltage component of the output of said rectifier-filter.

2. An apparatus according to claim 1 in which said means for driving said switch is an electric motor.

3. An apparatus according to claim 2 in which said sensing element includes a base member and a support means depending from said base member on which said plurality of small-diameter, corrodible, electrical wire sections are mounted and serially connected, thereby forming a plurality of junctions intermediate between adjacent sections, said serially connected sections being of substantially equal length, cross-section, and electrical resistance.

4. An apparatus according to claim 2 in which said sensing element includes a base member and a tubular electrically non-conducting support depending from said base member, on which said plurality of small-diameter, corrodible, electrical wire sections are mounted and serially connected, thereby forming a plurality of junctions intermediate between adjacent sections, said serially connected wire sections being helically disposed on the outer surface of said tubular support, said low-resistance, electrical conductors being disposed within said tubular support and connected to said wire sections at the junctions between each pair of said sections.

References Cited in the file of this patent

UNITED STATES PATENTS

| | | |
|---|---|---|
| 1,369,407 | Diehl | Feb. 22, 1921 |
| 1,694,330 | Lundberg | Dec. 4, 1928 |
| 2,117,462 | Thal | May 17, 1938 |
| 2,217,626 | Strang et al. | Oct. 8, 1940 |
| 2,285,118 | Jones | June 2, 1942 |
| 2,339,116 | Smith | Jan. 11, 1944 |
| 2,735,754 | Dravnieks | Feb. 21, 1956 |
| 2,824,283 | Ellison | Feb. 18, 1958 |
| 2,828,479 | Jackson | Mar. 25, 1958 |
| 2,834,858 | Schaschl | May 13, 1958 |

OTHER REFERENCES

Hudson: "The Atmospheric Corrosion of Metals," Proceedings of Physical Society, vol. 40, October 20, 1927.

Radar Electronic Fundamentals, June 1944, page 109.

Terrell et al.: "An Electrical Resistance Technique for Measuring the Corrosivity of Naphtha Streams," Corrosion—National Association of Corrosion Engineers, October 1956, vol. 12, pages 31–34.